Jan. 24, 1933.                F. SHORT                1,895,211
                         MOTION PICTURE CAMERA
                          Filed Aug. 16, 1926
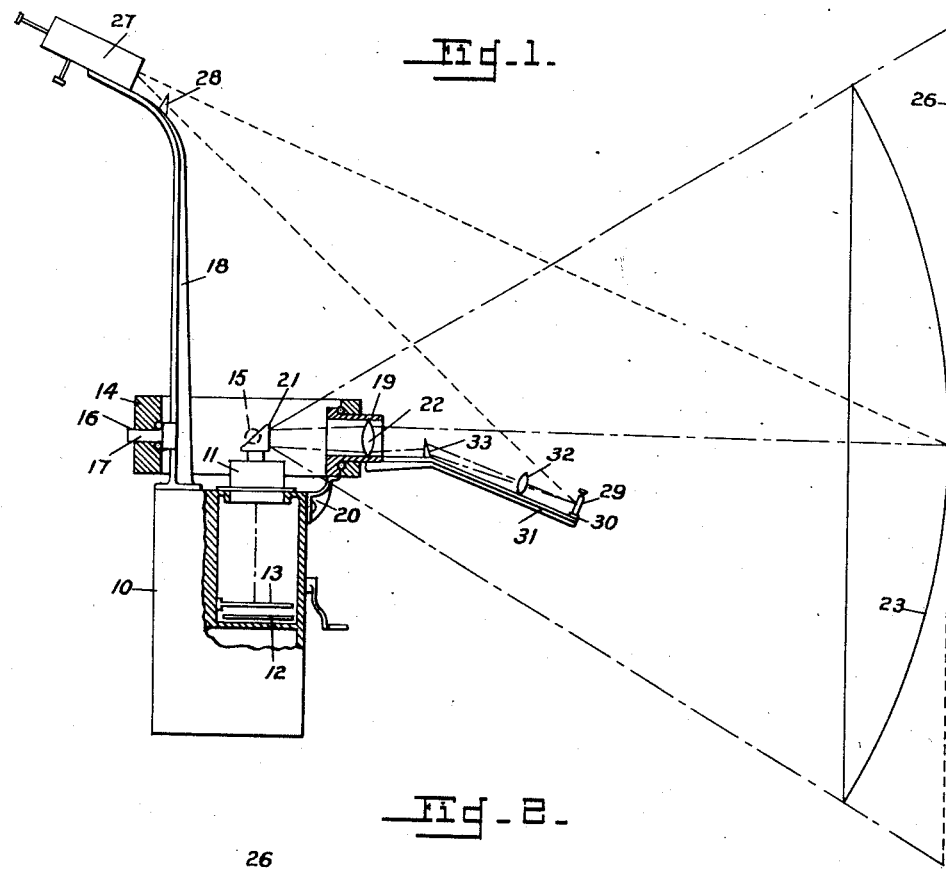
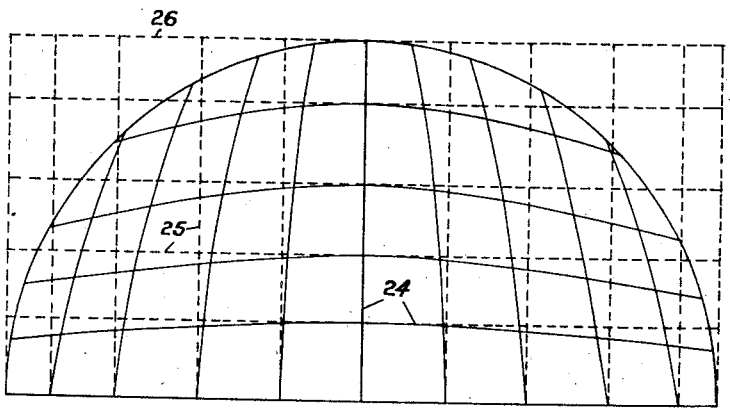
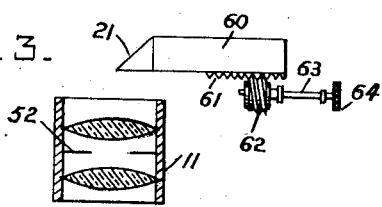
Inventor
Frank Short
By W. N. Roach.
Attorney Patented Jan. 24, 1933

1,895,211

UNITED STATES PATENT OFFICE

FRANK SHORT, OF POUGHKEEPSIE, NEW YORK

MOTION PICTURE CAMERA

Application filed August 16, 1926. Serial No. 129,644.

The subject of this invention is a motion picture camera.

The object of the present invention is to take motion pictures of an object or objects in one location superimposing them on pictures of a desired pattern, objects, or background which is in another location. It may be used as a photo-theodolite to photograph a falling bomb or the like, each picture having superimposed upon it coordinates from which measurements may be made directly on the film. It may also be used to photograph photo-play actors for a plane screen and to superimpose the desired scenery upon each film from a reduced picture located suitably beside the camera.

The following description refers particularly to the use of the invention as a photo-theodolite.

In devices of this character heretofore known it has been customary to photograph the scale readings periodically, this operation depending for its accuracy on the skill of the operator in keeping the cross hairs of the instrument on the object, whereas, with the present invention no such exactitude is required and personal errors are entirely eliminated.

According to the invention the photograph is taken with the aid of a concave spherical screen positioned at one side of the camera and marked with a pattern which may be the radial projection of a rectangular system of co-ordinates on a plane surface. At the center of the curvature of the screen is a prism on the camera lens, thereby permitting the camera to be oriented without destroying the focal adjustment of the pattern. Provision may be also made for superimposing on the film a record of the time of flight of the bomb while a suitable lighting apparatus for intensely illuminating the screen and the timing device may be rotated with the camera.

To this and other ends my invention consists in the construction, arrangement and combination of elements, described hereinafter and pointed out in the claims forming a part of this specification.

A practical embodiment of my invention is illustrated in the accompanying drawing in which Fig. 1 is a plan view of the apparatus, partly in section;

Fig. 2 is a view looking into the screen showing in diagram the coordinates of the plane surface;

Fig. 3 is a view, somewhat diagrammatic, showing means for controlling the relative intensity of the superimposed images by adjusting the relative area of the main objective lens covered by the image superimposing means.

Referring to the drawing by numerals of reference:

A motion picture camera 10 of any suitable type may have a long focal lens 11 for focusing an image on a film 12 which is located behind a shutter 13. This shutter, 13, is preferably of the usual revolving type, being an opaque disk with a sector cut out to permit light to pass once each revolution, the passage of the light being timed by the usual means so that the film is stationary while exposed to this light.

The camera is mounted for pivotal movement in a gimbel ring 14 having vertically disposed bearings 15 for mounting the ring on a separate support (not shown) and horizontal bearings 16 for the reception of the pivots of the camera. The rear pivot 17 is secured to an arm 18 of the camera body while the forward pivot 19 is formed integrally with a projecting bracket 20.

A small 45° prism 21 is placed with its reflecting surface at the intersection of the camera lens axis and the axes of the gimbel ring and is so disposed, covering a part of the lens aperture, that it will not interfere with the focusing of a bomb, actors, or other objects to be photographed.

The forward pivot 19 is tubular and carries a lens 22 for bringing the surface of the concave spherical screen to a focus on the film 12 even though the focus of the lens 11 be adjusted for an infinite distance.

The screen 23 is marked with a pattern 24 which may be the radial projection on its spherical surface of a rectangular or other system of coordinates 25 as represented on a plane surface 26. This pattern may also be scenery superimposed on the main picture of the film. Where a lined pattern is used on the screen, it is preferably composed of white lines on a black back-ground so that it will interfere as little as possible with the main picture.

The prism 21 is at the center of the curvature of the spherical surface of the screen 23 and consequently the camera may be oriented without destroying the focal adjustment of the pattern on the film as would be the case if the screen were a plane surface.

The arm 18 has secured to its outermost portion a source of light 27 for intensely illuminating the screen which is being photographed.

A prism 28, in front of the light 27, deflects a ray of light onto a second watch 29, which is held in any suitable manner as by a clip 30 on a bracket 31 which may be conveniently secured to the camera. The bracket 31 also carries a lens 32 and a prism 33 for deflecting the image of the watch to the lens 22 so that a record of the time may be super-imposed on the film, when the camera is used as a photo-theodolite.

In operation as a photo-theodolite, the bomb to be photographed passes in its flight before the objective lens 11, the camera being moved to follow the passage of the bomb. Inasmuch as the screen and watch are focused through the lens 22 on the film 12 each picture will have superimposed thereon the coordinates of the screen and also the readings of the watch, so that an accurate representation is obtained from which measurements may be made directly from the film.

For photo-play photographing, the players perform in front of the objective lens and scenery or other players are super-imposed on the film by the invention.

It may be noted that by properly proportioning the focal length of the lens 22 and the relative illumination of main and auxiliary scenes, giants, dwarfs, phantoms, etc., may be interposed into the scenes by actors in front of the screen 23. As the focus of lens 22 approaches infinity, the screen 23 may acquire greater depth, it being unnecessary to have it curved or even approximately in a single plane.

A means of changing the relative intensity of the two scenes may be provided as shown in Fig. 3 wherein the prism reflector 21 is mounted on a slide 60 which is suitably guided to move transversely with respect to the axis of the objective lens, 11, and which is provided with a rack 61, which engages the worm 62. A shaft, 63, and a thumb screw, 64, operate the slide, 60, and cause it at will to cover a greater or a lesser portion of the aperture of objective lens 11.

These and other uses are contemplated by the invention to simplify present applications of motion pictures and to create new possibilities of using such equipment.

While in the foregoing there has been illustrated and described such combination and arrangement of elements as constitute the preferred embodiment of the invention, it is nevertheless desired to emphasize the fact that interpretation of the invention should be only conclusive when made in the light of the subjoined claims.

I claim:

1. In a motion picture camera, a gimbel ring provided with a tubular pivot, a camera mounted on the gimbel, a separate lens system mounted on the gimbel the axis of the lens system passing through the tubular pivot, and means for directing rays passing through the lens system into the camera.

2. In a motion picture camera a gimbel ring provided with a tubular pivot, a camera mounted on the gimbel, a separate lens system mounted on the gimbel with its axis passing through the tubular pivot, and a reflector located at the intersection of the pivot axes of the gimbel for reflecting rays from the lens system into the camera.

3. In a motion picture camera a gimbel ring provided with a tubular pivot, a camera mounted on the gimbel, a separate lens system mounted on the gimbel with its axis passing through the tubular pivot, a reflector directing rays from the lens system into the camera, and means for adjusting the reflector.

4. In a motion picture camera a pivotal mounting provided with a tubular pivot, a camera carried by the mounting, a separate lens system carried by the mounting with its axis passing through the tubular pivot, and means for reflecting rays from the lens system into the camera.

FRANK SHORT.